(12) United States Patent
Yang

(10) Patent No.: US 8,608,074 B2
(45) Date of Patent: Dec. 17, 2013

(54) METHOD AND APPARATUS FOR LOCATING AND DECODING MACHINE-READABLE SYMBOLS

(75) Inventor: Yang Yang, Toronto (CA)

(73) Assignee: Seiko Epson Corporation, Tokyo (JP)

( * ) Notice: Subject to any disclaimer, the term of this patent is extended or adjusted under 35 U.S.C. 154(b) by 35 days.

(21) Appl. No.: 13/526,819

(22) Filed: Jun. 19, 2012

(65) Prior Publication Data

US 2013/0153665 A1 Jun. 20, 2013

Related U.S. Application Data

(60) Provisional application No. 61/577,801, filed on Dec. 20, 2011.

(51) Int. Cl.
*G06K 19/06* (2006.01)
(52) U.S. Cl.
USPC .................................................. 235/462.16
(58) Field of Classification Search
USPC ........................................ 235/462.01–462.49
See application file for complete search history.

(56) References Cited

U.S. PATENT DOCUMENTS

| | | | |
|---|---|---|---|
| 4,879,456 A | 11/1989 | Cherry et al. | |
| 5,481,097 A * | 1/1996 | Tafoya | 235/462.12 |
| 5,489,689 A * | 2/1996 | Mathew | 546/242 |
| 5,889,270 A * | 3/1999 | van Haagen et al. | 235/462.15 |
| 6,386,454 B2 | 5/2002 | Hecht et al. | |
| 6,749,120 B2 | 6/2004 | Hung et al. | |

* cited by examiner

*Primary Examiner* — Daniel Hess

(57) ABSTRACT

For recognizing two-width barcodes having N bars and N spaces, a first class (cluster) A of wide bars or spaces contains n elements Array [1] to Array [n], and a second class (cluster) B of narrow bars or spaces contains N−n elements Array [n+1] to Array [N] are created. Looping n times where n=1 to N−1, a mean value $\mu_A$ to of class A and a mean value $\mu_B$ of class B are calculated, a between-class difference $D=\mu_A-\mu_B$ is calculated, a value of n when D achieves a maximum value is recorded, and if n=M when D achieves the maximum value, then the N bars or spaces are recognized as a two-width barcode; otherwise, the N bars or spaces are determined as not a two-width barcode.

11 Claims, 3 Drawing Sheets

METHOD AND APPARATUS FOR LOCATING AND DECODING MACHINE-READABLE SYMBOLS

CROSS-REFERENCE TO RELATED APPLICATION(S)

This application claims the benefit under 35 U.S.C. 119(e) of Provisional Patent Application No. 61/577,801, filed Dec. 20, 2011, which is hereby incorporated by reference in its entirety.

BACKGROUND

Field of Invention

Barcodes have been utilized for identifying and pricing objects for more than forty years. A barcode is an optical, machine-readable representation of data. The data represents information (e.g. an id linked to price and name) about the object to which the bar code is attached. Originally, barcodes represented data by varying the widths of, and spacing between, parallel lines, and may be referred to as linear or 1 dimensional (1D). Barcodes originally were scanned by special optical scanners called barcode readers; later, scanners and interpretive software became available on devices including desktop printers, smartphones and scanners.

Linear symbologies can be classified into two categories: two-width vs. many-width. Bars and spaces in two-width symbologies are wide or narrow; the exact width of a wide bar has no significance as long as the symbology requirements for wide bars are adhered to. Bars and spaces in many-width symbologies are all multiples of a basic width called the module. Among the common linear barcodes, Interleaved 2 of 5 (ITF), code 39, Codabar are two-width barcodes; and UPC, Code 128 and EAN-8/13 are many-width barcodes.

Decoding linear barcodes is the most important module for any barcode recognition system. The traditional algorithms to decode linear two-width barcodes use a threshold calculated based on the widths of a barcode's elements to determine if a bar or space is wide or narrow. However, traditional algorithms do not work well when the image quality of barcodes is low, for example, when barcodes are scanned into black/white images. This is because the threshold cannot be determined correctly when image quality is low.

SUMMARY OF INVENTION

An object of the present invention is to improve the decoding accuracy of barcodes.

The present invention uses a clustering approach to determine the wide and narrow elements of two-width barcodes.

Specifically, an image of N bars and N spaces is first acquired. For recognizing two-width barcodes having N bars and N spaces, with each two-width barcode having M wide bars or spaces and N−M narrow bars or spaces, the present invention sorts the N bars or spaces according to width in descending order from widest bar or space to narrowest bar or space. A first class (cluster) A of wide bars or spaces contains n elements Array [1] to Array [n], and a second class (cluster) B of narrow bars or spaces contains N−n elements Array [n+1] to Array [N]. The present invention then loops n times where n=1 to N−1 to calculate a mean value $\mu_A$ of class A and a mean value $\mu_B$ of class B, calculate a between-class difference $D=\mu_A-\mu_B$, record a value of n when D achieves a maximum value, and if n=M when D achieves the maximum value, then recognizing the N bars or spaces as a two-width barcode; otherwise, determining the N bars or spaces are not a two-width barcode.

In an embodiment, N=5 and M=2, such as in an ITF barcode where there are 5 bars and 5 spaces, and among the 5 bars, 2 bars are wide, and among the 5 spaces, 2 spaces are wide.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

Figure 1:
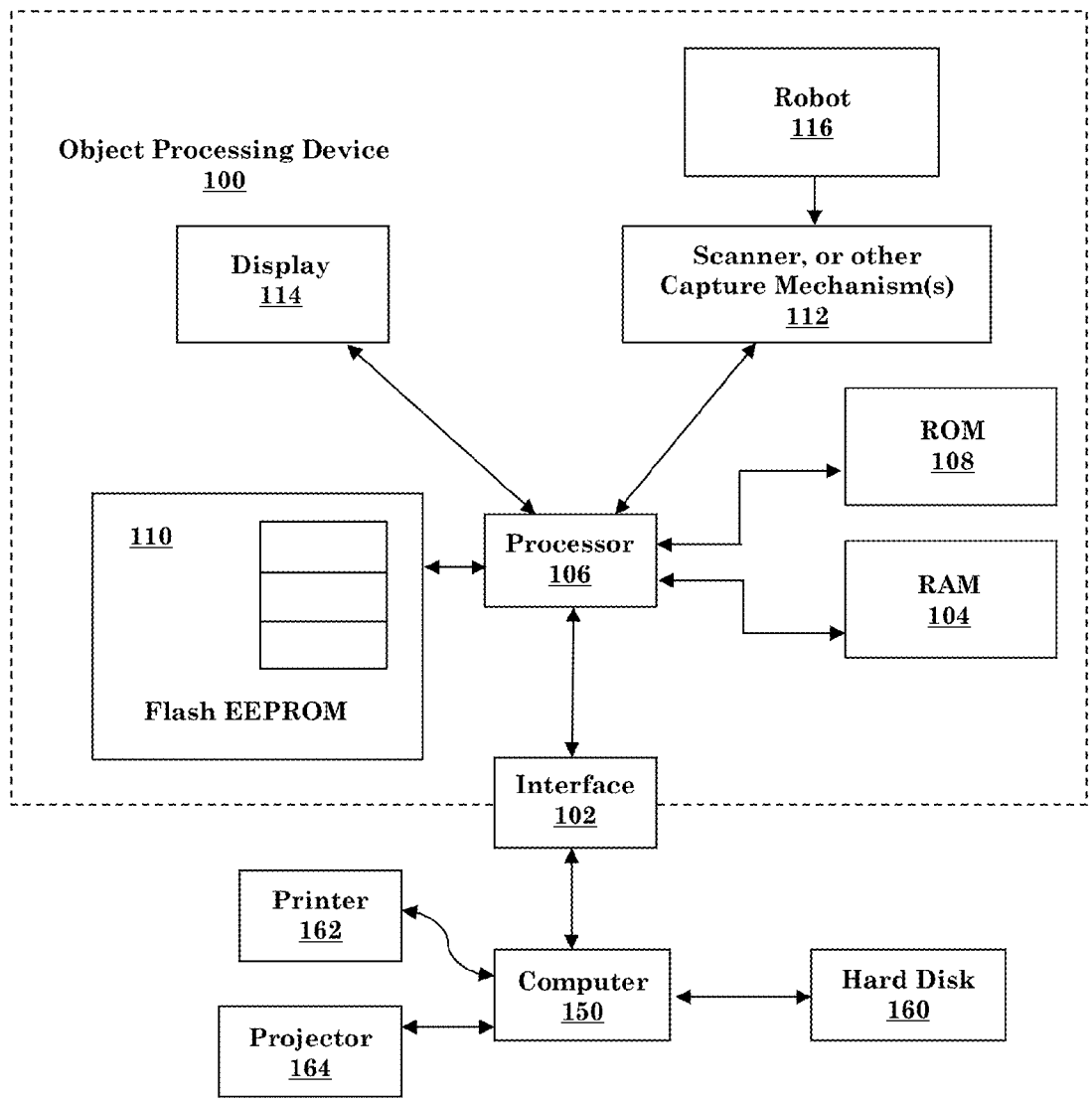
FIG. 1 is a general block diagram of an object processing device and system for utilizing the present invention.

In the following detailed description, reference is made to the accompanying drawings that show, by way of illustration, example embodiments of the invention. In the drawings, like numerals describe substantially similar components throughout the several views. These embodiments are described in sufficient detail to enable those skilled in the art to practice the invention. Other embodiments may be utilized and structural, logical and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

In general, example embodiments relate to methods, devices, and computer-readable media for decoding or recognizing barcodes.

A schematic representation of an example object processing device 100 is shown in FIG. 1. The object processing device 100 exchanges data with a host computer 150 by way of an intervening interface 102. Application programs and an object processing device driver may also be stored for access on the host computer 150. When an image retrieve command is received from the application program, for example, the object processing device driver controls conversion of the command data to a format suitable for the object processing device 100 and sends the converted command data to the object processing device 100. The driver also receives and interprets various signals and data from the object processing device 100, and provides necessary information to the user by way of the host computer 150.

When data is sent by the host computer 150, the interface 102 receives the data and stores it in a receive buffer forming part of a RAM 104. The RAM 104 can be divided into a number of sections, for example through addressing, and allocated as different buffers, such as a receive buffer or a send buffer. Data, such as digital image data, can also be obtained by the object processing device 100 from the capture mechanism(s) 112, the flash EEPROM 110, or the ROM 108. The capture mechanism(s) 112 can be a scanner, for example, and generates a digital image by scanning one or more objects, such as a barcode label on a part to be used in manufacturing and/or assembly of a device such as a printer. The scanner 112 can be controlled by robot 116, for example, or a human, or can be automatically controlled by computer 150, for example. The digital image of the object(s) can then be stored in the receive buffer or the send buffer of the RAM 104.

Figure 3:
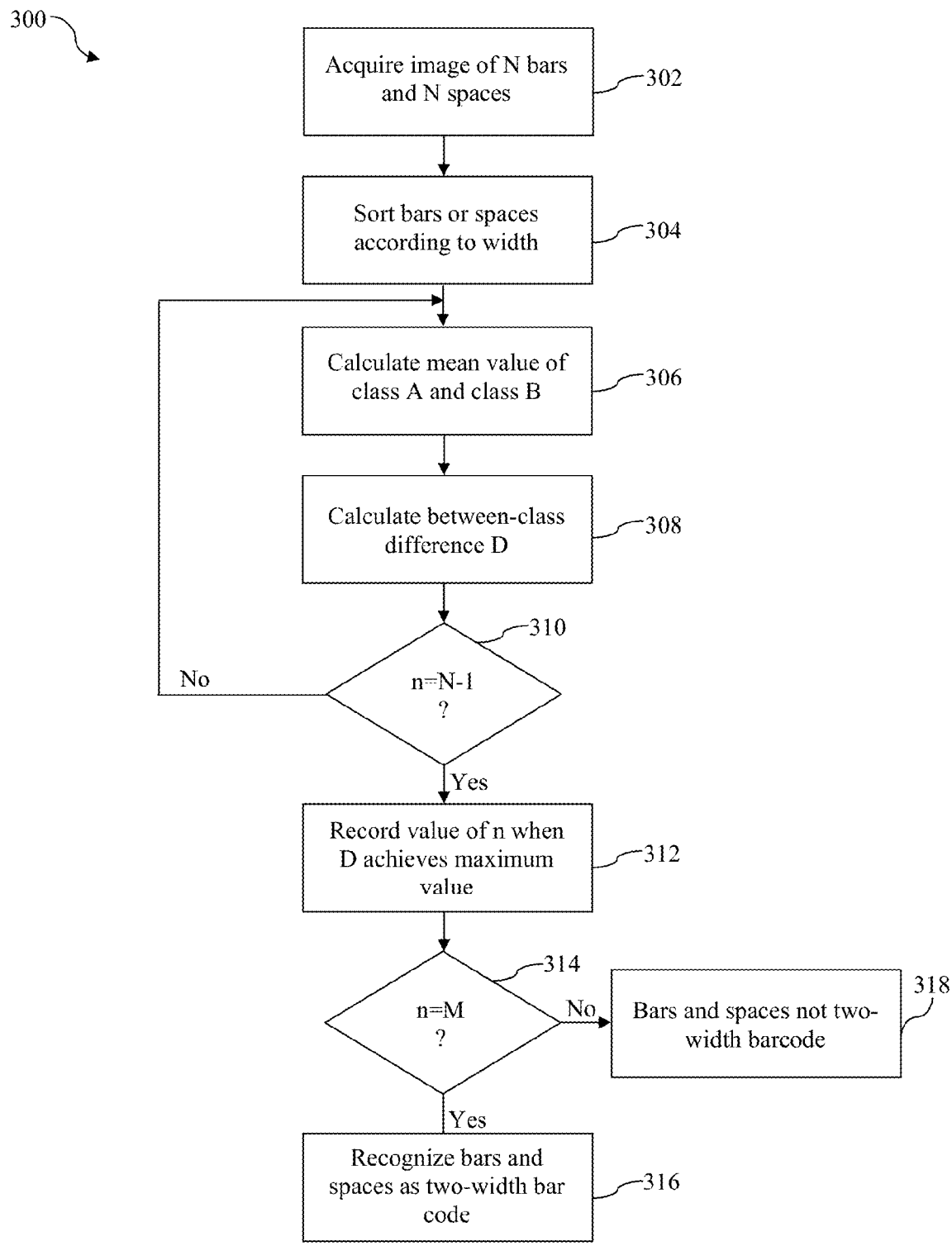
FIG. 3 is a flowchart showing the general steps of the present invention.

A processor 106 uses computer-executable instructions stored on a ROM 108 or on a flash EEPROM 110, for example, to perform a certain function or group of functions, such as the method 300 (FIG. 3) for example. Method 300 will be discussed in greater detail later herein. Where the data in the receive buffer of the RAM 104 is a digital image, for example, the processor 106 can implement the methodological acts of the method 300 on the digital image. Further processing in an imaging pipeline may then be performed on the digital image before the image is displayed on a display 114, such as an LCD display for example, or transferred to the host computer 150, for printing on printer 162, projected with projector 164, or stored on hard disk 160, for example.

The example method 300 and variations thereof disclosed herein can be implemented using non-transitory computer-readable media for carrying or having computer-executable instructions or data structures stored thereon. Such computer-readable media can be any available media that can be accessed by a processor of a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store program code in the form of computer-executable instructions or data structures and that can be accessed by a processor of a general purpose or special purpose computer. Combinations of the above should also be included within the scope of computer-readable media.

Computer-executable instructions comprise, for example, instructions and data that cause a processor of a general purpose computer or a special purpose computer to perform a certain function or group of functions. Although the subject matter is described herein in language specific to methodological acts, it is to be understood that the subject matter defined in the appended claims is not necessarily limited to the specific acts described herein. Rather, the specific acts described herein are disclosed as example forms of implementing the claims.

In an embodiment, the method steps of the present invention described hereinafter are preferably performed by one or more processors in the object processing device 100 and/or computer 150 executing computer-executable instructions, programs, software, firmware, that are stored or loadable in memory in object processing device 100 and/or computer 150 and/or in accessible external memory. Computer 150 processors may include, for example, a central processing unit (CPU) and one or more graphical processing units (GPUs). The internal memory may include, for example, RAM and ROM. An I/O interface enables communication with a keyboard, mouse, and external memory such as hard disk 160, for example.

Examples of special purpose computers include image processing devices such as digital cameras (an example of which includes, but is not limited to, the Epson R-D1 digital camera manufactured by Seiko Epson Corporation headquartered in Owa, Suwa, Nagano, Japan), digital camcorders, projectors, printers, scanners, copiers, portable photo viewers (examples of which include, but are not limited to, the Epson P-3000 or P-5000 portable photo viewers manufactured by Seiko Epson Corporation), or portable movie players, or some combination thereof, such as a printer/scanner/copier combination (examples of which include, but are not limited to, the Epson Stylus Photo RX580, RX595, or RX680, the Epson Stylus CX4400, CX7400, CX8400, or CX9400Fax, and the Epson AcuLaser® CX11NF manufactured by Seiko Epson Corporation) or a printer/scanner combination (examples of which include, but are not limited to, the Epson TM-J9000, TM-J9100, TM-J7000, TM-J7100, and TM-H6000III, all manufactured by Seiko Epson Corporation) or a digital camera/camcorder combination.

To understand the present invention it is useful to understand the conventional method for decoding two-width barcodes.

Conventionally, the main step for decoding a two-width barcode is to determine the wide element (bar/space) and narrow element (bar/space). The traditional decode algorithm will calculate a threshold T and then compare the width of each element with T to determine if an element is wide or narrow.

Take the interleaved 2 of 5 (ITF) barcode for an example. The following steps are used to determine the wide and narrow elements:

Measure the widths of each of the ten elements of the symbol character and accumulate their sum, S.

Compute the width threshold value, $T=(7/64) \times S$.

Compare the individual element widths to the threshold; if an element width is >T, assume that element is wide, otherwise assume that the element is narrow.

During large scale tests of the conventional method for decoding two-width barcodes, a serious issue is encountered that is: the decode accuracy of two-width barcodes is very low when the barcode is scanned into black/white image. The root problem is due to the imperfect binarization, the widths of bar/space elements change greatly from their real dimensions, which makes some wide elements not so wide or some narrow elements not so narrow as compared with the threshold T calculated based on the conventional method described above.

Figure 2:
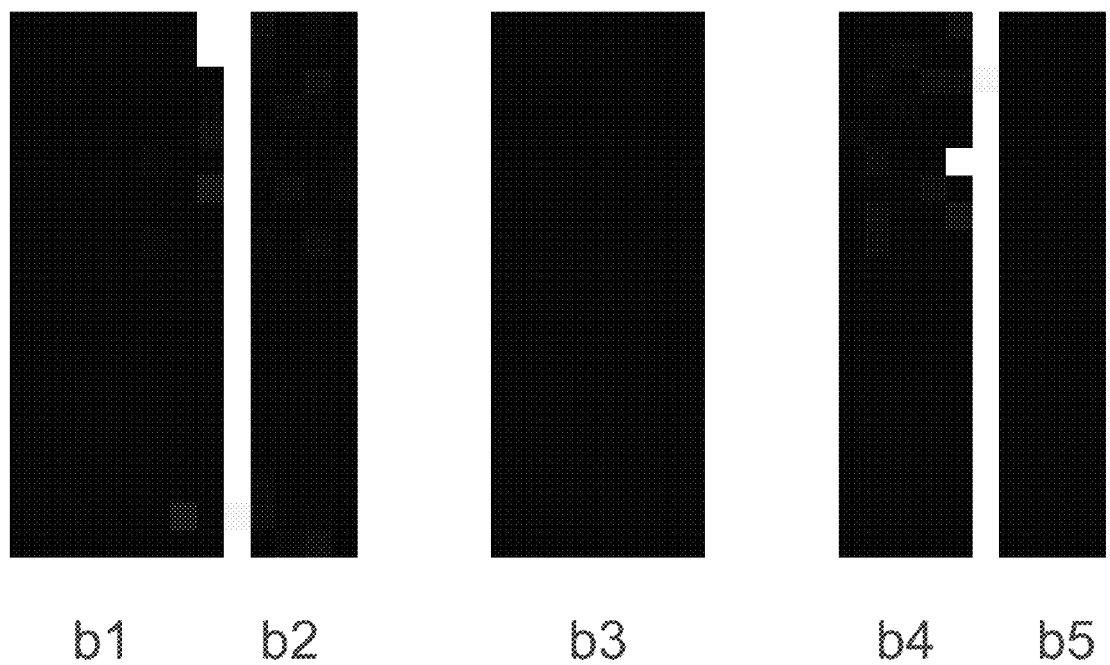
FIG. 2 illustrates an ITF barcode that may be incorrectly decoded using a conventional decoding method.

FIG. 2 shows such an example. Using the conventional method described above, b1, b3 and b4 are determined as wide bars. However, in one ITF character, there should be only 2 wide bars or 2 wide spaces so this barcode will fail to be decoded.

The present invention provides a robust decode method for two-width barcodes by using a clustering method to determine wide/narrow elements.

The wide and narrow elements cannot be determined correctly using the threshold approach of the conventional method described above on many black/white images of barcodes. Adjusting the threshold may be a straightforward way to overcome the problem. However, it is difficult or impossible to determine an optimized threshold for all situations. Moreover, an improper threshold will increase the chances of misread or false detection of a barcode.

The present invention does not need a threshold to determine wide and narrow elements. Take ITF barcode as an example. An ITF character contains 10 elements: 5 bars and 5 spaces. Among the five bars, 2 bars are wide bars, and among the 5 spaces, two spaces are wide spaces. The present invention considers the detection task as a clustering problem. Clustering, generally, is the task of assigning a set of objects into groups (called clusters) so that the objects in the same cluster are more similar (in some sense or another) to each other than to those in other clusters. The widths of 5 bars can be considered as a data set and this data set contains 5 elements (5 bars). Similarly the widths of the spaces can be considered as a data set and this data set contains 5 elements (5 spaces). There are 2 clusters in the bar data set: cluster A and cluster B. Cluster A contains all the wide elements and cluster B contains all the narrow elements. Similarly, there are 2 clusters in the space data set: cluster A and cluster B. Normal 2-means clustering algorithm can be applied to this task. If cluster A contains exactly 2 elements, then these elements are ITF elements; otherwise, they are not ITF elements.

One embodiment of the present invention uses k-means clustering, e.g. 2-means clustering, which is a method of cluster analysis that aims to partition n observations into 2 clusters in which each observation belongs to the cluster with the nearest mean. Since there are only 5 elements in the bar data set and 5 elements in the space data set, the preferred embodiment of the present invention does not use the traditional 2-means clustering algorithm, which is relatively slow. Instead, referring to FIG. 3, the method of the present invention is as follows:

acquiring an image of N bars and N spaces (step 302, this image could be acquired using scanner 112, or the image may have been previously stored in RAM 104 or hard disk 160, for example)

for recognizing two-width barcodes having N bars and N spaces, with each two-width barcode having M wide bars or spaces and N–M narrow bars or spaces, using processor 106, for example, to:

sort the N bars or spaces according to width in descending order from widest bar or space to narrowest bar or space (step 304);

loop n (until step 310 returns YES), where n=1 to N–1, wherein a first class (cluster) A of wide bars or spaces contains n elements Array [1] to Array [n], and a second class (cluster) B of narrow bars or spaces contains N–n elements Array [n+1] to Array [N];

calculate a mean value to of class A and a mean value $\mu_B$ of class B (step 306), where $$\mu_A = \frac{\sum_{k=1}^{n} \text{Array}[k]}{n},$$

$$\mu_B = \frac{\sum_{k=n+1}^{N} \text{Array}[k]}{N-n};$$

calculate a between-class difference $D=\mu_A-\mu_B$ (step 308);
record a value of n when D achieves a maximum value (step 312); and if n=M when D achieves the maximum value (step 314 returns YES), then recognize the N bars or spaces as a two-width barcode (step 316); otherwise (step 314 returns NO), determine the N bars or spaces are not a two-width barcode (step 318).

Taking the ITF barcode as an example, N=5 and M=2 where there are 5 bars and 5 spaces and among the 5 bars, 2 bars are wide, and among the 5 spaces, 2 spaces are wide.

Thus, using the present invention, any 5 bars and 5 spaces can be recognized as ITF bars/spaces. Which bars/spaces are wide bars/spaces are determined as well in the method of the present invention since the bars or spaces are sorted according to width.

As previously mentioned, no threshold is involved during the process of the present invention.

Experimental Results of the Present Invention

Experiments on three sets of ITF barcodes (EDGE 1D, IJP2, and IJP600) were conducted to verify the accuracy improvement of the present invention. The method of the present invention is designated as ESDL v2.3.6 in Table 1 below. A previous method, using a threshold, is designated as ESDL v2.3.5 in Table 1 below. A commercially available barcode recognition and decoding software program is designated as Omniplanar in Table 1 below.

With the method of the present invention (ESDL v2.3.6), ITF barcode recognition accuracy is greatly improved as shown in Table 1.

TABLE 1

| Group | # ITF Barcodes | Accuracy | | |
| --- | --- | --- | --- | --- |
| | | Omniplanar | ESDL v2.3.5 | ESDL v2.3.6 |
| EDGE 1D | 1215 | 76.30% | 65.35% | 82.88% |
| IJP2 | 192 | 96.35% | 75.00% | 96.35% |
| IJP600 | 96 | 100.00% | 87.50% | 100.00% |

On the EDGE 1D Barcode set, compared with a previous recognition algorithm ESDL v2.3.5, ITF decoding accuracy is improved 17.53% (from 65.35% to 82.88%) in the present invention; compared with Omniplanar, ITF decoding accuracy of 82.88% of the present invention is now better than Omniplanar's 76.3%.

On the IJP2 and IJP600 sets, compared with the previous recognition algorithm ESDL v2.3.5, ITF decoding accuracy is improved 21.35% (from 75% to 96.35%) on IJP2 set in the present invention, and 13.5% (from 87.5% to 100%) on the IJP600 set; compared with Omniplanar, ITF decoding accuracy of the present invention is equal to Omniplanar's.

Moreover, overall misread is reduced to 0% from 0.26% of the previous recognition algorithm ESDL v2.3.5.

With respect to speed, the present invention matches the previous method and conventional methods.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A method for recognizing two-width barcodes having N bars and N spaces, with each two-width barcode having M wide bars or spaces and N–M narrow bars or spaces, comprising using a processor to:

sort the N bars or spaces according to width in descending order from widest bar or space to narrowest bar or space;
loop n, where n=1 to N–1, wherein a first class A of wide bars or spaces contains n elements Array [1] to Array [n], and a second class B of narrow bars or spaces contains N–n elements Array [n+1] to Array [N];
calculate a mean value $\mu_A$ of class A and a mean value $\mu_B$ of class B, where $$\mu_A = \frac{\sum_{k=1}^{n} \text{Array}[k]}{n},$$

$$\mu_B = \frac{\sum_{k=n+1}^{N} \text{Array}[k]}{N-n};$$

calculate a between-class difference $D=\mu_A-\mu_B$;

record a value of n when D achieves a maximum value; and if n=M when D achieves the maximum value, then recognize the N bars or spaces as a two-width barcode; otherwise, determine the N bars or spaces are not a two-width barcode.

2. A method as in claim 1 wherein N=5 and M=2, and if n=2 when D achieves the maximum value, then recognizing the 5 bars or spaces as an ITF barcode where there are 5 bars and 5 spaces, and among the 5 bars, 2 bars are wide, and among the 5 spaces, 2 spaces are wide.

3. A method as in claim 1 wherein the processor uses k-means clustering to cluster the bars or spaces into the first class A and the second class B.

4. A device for recognizing two-width barcodes having N bars and N spaces, with each two-width barcode having M wide bars or spaces and N–M narrow bars or spaces, comprising:

a unit for inputting an image of N bars and N spaces; and a processor that:

sorts the N bars or spaces according to width in descending order from widest bar or space to narrowest bar or space;

loops n, where n=1 to N–1, wherein a first class A of wide bars or spaces contains n elements Array [1] to Array [n], and a second class B of narrow bars or spaces contains N–n elements Array [n+1] to Array [N];

calculates a mean value $\mu_A$ of class A and a mean value $\mu_B$ of class B, where $$\mu_A = \frac{\sum_{k=1}^{n} \text{Array}[k]}{n},$$

$$\mu_B = \frac{\sum_{k=n+1}^{N} \text{Array}[k]}{N-n};$$

calculates a between-class difference $D=\mu_A-\mu_B$;

records a value of n when D achieves a maximum value; and if n=M when D achieves the maximum value, then recognizes the N bars or spaces as a two-width barcode; otherwise, determines the N bars or spaces are not a two-width barcode.

5. A device as in claim 4 wherein N=5 and M=2, and if n=2 when D achieves the maximum value, then recognizing the 5 bars or spaces as an ITF barcode where there are 5 bars and 5 spaces, and among the 5 bars, 2 bars are wide, and among the 5 spaces, 2 spaces are wide.

6. A device as in claim 4 wherein the processor uses k-means clustering to cluster the bars or spaces into the first class A and the second class B.

7. A device as in claim 4 wherein the unit for inputting an image is a scanner.

8. A device as in claim 4 further comprising a memory for storing the image.

9. One or more tangible, non-transitory computer-readable media embodying instructions executable by a computer to perform a method for recognizing two-width barcodes having N bars and N spaces, with each two-width barcode having M wide bars or spaces and N–M narrow bars or spaces, the method comprising:

sorting the N bars or spaces according to width in descending order from widest bar or space to narrowest bar or space;

looping n, where n=1 to N–1, wherein a first class A of wide bars or spaces contains n elements Array [1] to Array [n], and a second class B of narrow bars or spaces contains N–n elements Array [n+1] to Array [N];

calculating a mean value $\mu_A$ of class A and a mean value $\mu_B$ of class B, where $$\mu_A = \frac{\sum_{k=1}^{n} \text{Array}[k]}{n},$$

$$\mu_B = \frac{\sum_{k=n+1}^{N} \text{Array}[k]}{N-n};$$

calculating a between-class difference $D=\mu_A-\mu_B$;

recording a value of n when D achieves a maximum value; and if n=M when D achieves the maximum value, then recognizing the N bars or spaces as a two-width barcode; otherwise, determining the N bars or spaces are not a two-width barcode.

10. The one or more tangible, non-transitory computer-readable media as in claim 9 wherein N=5 and M=2, and if n=2 when D achieves the maximum value, then recognizing the 5 bars or spaces as an ITF barcode where there are 5 bars and 5 spaces, and among the 5 bars, 2 bars are wide, and among the 5 spaces, 2 spaces are wide.

11. The one or more tangible, non-transitory computer-readable media as in claim 9 further comprising using k-means clustering to cluster the bars or spaces into the first class A and the second class B.

* * * * *